United States Patent Office 2,795,622
Patented June 11, 1957

2,795,622

PRODUCTION OF HEXACHLOROCYCLO-
PENTADIENE

Georges Wetroff, Le Thillay, and Isidor Raitzyn, Paris, France, assignors to Pechiney Compagnie de Produits Chimiques et Electrometallurgiques, Paris, France, a corporation of France No Drawing. Application July 11, 1955,
Serial No. 521,383

5 Claims. (Cl. 260—648)

This invention relates to the production of hexachlorocyclopentadiene by the direct action of chlorine upon pentane. It is well known that hexachlorocyclopentadiene is a raw material of increasing importance for the manufacture of plasticizers, insecticides, fungicides and polyesters.

Many methods of producing hexachlorocyclopentadiene have been proposed using several different raw materials, but the processes or results have not been too satisfactory, either because of the high cost of the required plant, of the equipment and of handling, or because of low yields and high impurity content difficult to remove.

On its face, the simplest method of production would appear to involve the direct action of chlorine on pentane in which (1) chlorine replaces hydrogen, (2) two double bonds are formed by dehydrochlorination, and (3) cyclization occurs. This procedure has been attempted with many variations in proportions of reactants and in reaction conditions, including operation in the presence of inert gases, with and without catalysts (as iron and nickel chlorides) or with pumice or other porous materials.

Because of the low yields obtained, wastage of reactants, unavoidable stoppages, and the presence of difficulty removable, undesired side reaction products in the reaction mass, producers requiring relatively pure hexachlorocyclopentadiene have generally effected the production from the pentane and chlorine in three stages or operations, as follows: (1) pentane chlorination at about 90° C. under ultraviolet light, (2) removal of hydrogen chloride at medium temperatures, and (3) cyclization at high temperature. Although this production process leads to purer hexachlorocyclopentadiene, it obviously involves much equipment and many operations, and hence a high cost of production.

The object of the present invention is to provide a much simpler, economically advantageous process wherein the hexachlorocyclopentadiene is obtained in high yields free of difficultly removable, objectionable side reaction products requiring separation.

In accordance with the present invention, this object is accomplished by the formation of the hexachlorocyclopentadiene directly from pentane and chlorine in a single step wherein the reaction is facilitated and controlled by the presence of barium sulfate as a catalyst.

The reaction is effectively accomplished by mixing the pentane with a large excess of chlorine and the catalyst and reacting at temperatures of from 400°–550° C. Through this procedure hexachlorocyclopentadiene is obtained in good yields in a condition free of difficultly removable impurities.

The process of the invention is preferably carried out in a continuous manner in a long, tubular reaction chamber filled with barium sulfate in a form providing a large surface area. The catalyst may be in the form of cylinders, lumps or as a surface coating on a supporting material or deposited in and on the surface of conventional porous supports. The volume ratio of the chlorine to the pentane passed through the tube is suitably from 40–80 of the former to 1 of the latter. The reaction mixture should be passed through the furnace at a rate which causes all of the pentane to react in the mass, for if this reactant is not removed the method of operation used in carrying out the process will cause the mixture to become progressively enriched in pentane and explosive conditions would arise. The effluent gases from the furnace may be collected by cooling to a point at which they condense and then removing the hydrogen chloride by dissolution in water. The excess chlorine is dried and recycled in the process by flowing the same to the inlet of the furnace where make-up chlorine is added to restore the required excess of chlorine in relation to the pentane.

The condensed organic product is purified by distillation under reduced presure. Hexachlorocyclopentadiene passes between 75 and 79° C. under 1 millimeter of mercury. Main impurities are $CCl_4$, $C_2Cl_4$ and $C_2Cl_6$ much more volatile and easy to separate.

*Example 1*

The process is carried out in a reaction tube or furnace which may be described as a tube 80 cm. long and 20 mm. in diameter. This tube contains a packing consisting of small cylinders of barium sulfate suitably of 4 mm. diameter and 15 mm. length. The tube is heated to a temperature of 490° to 500° C. suitably by means of electricity and a gaseous mixture of 1 volume of pentane and 60 volumes of chlorine is passed through the hot tube, the rate of flow being controlled by accurate flow meters. In passing through the tube a reaction occurs and hexachlorocyclopentadiene is formed.

The organic chlorinated products leaving the furnace are then cooled by any suitable means to a point where condensation occurs. Thereupon hydrogen chloride is removed by dissolution and the excess of chlorine in the mass is removed, dried and recycled to the inlet of the furnace where make-up chlorine is added. The rate of flow through the furnace is regulated such that the pentane is completely consumed, the rate of 4 to 5 gm. of pentane per hour being the maximum permissible rate in this furnace tube.

In a test run the foregoing process was continued for a period of 100 hours without interruption. An examination of the interior of the furnace and of the product indicated that no pulverulent carbon had formed. From the reaction mass during this period there were collected 15 to 18 gm. of chlorinated organic products $$(-n_D^{20}1.565 - d_{20}1.75)$$

Upon purification by distillation, the yield of hexachlorocyclopentadiene was found to be 70% in relation to the pentane used. The volatile impurities were composed of:

Hexachlorocyclopentadiene dimer
Carbon tetrachloride
Tetrachlorethylene
Hexachlorethane The foregoing process leads to numerous advantages over the various processes hereinbefore suggested in the literature. The equipment employed in the present process is quite simple. The proportion of low molecular reaction products resulting from over-halogenation is reduced by about 50% as compared with results without the catalyst. The amount of chlorine consumption in the process is reduced. The hexachlorocyclopentadiene can be easily purified. The percentage of dimer products is lowered. The output of the furnace is increased by 20 to 25%, the yield thus being raised. (With pumice material instead of barium sulfate in the described process, the yield was about 50%. With this material, many operational difficulties were encountered, which difficulties were also met when nickel chloride or ferric chloride supported on a porous material were used.) Lastly the production is effected directly from chlorine and pentane as the raw materials without resort to the tedious and explosive transformation of pentane into polychlorinated products effected in certain of the prior processes.

It should be understood that the present invention is not limited to the specific conditions herein given, but that it extends to all equivalents which will occur to those skilled in the art upon consideration of the scope of the claims appended hereto.

We claim:

1. A process for the preparation of hexachlorocyclopentadiene which comprises, reacting chlorine with pentane at a temperature within the range of about 400–550° C. in the presence of barium sulfate.

2. A process for the preparation of hexachlorocyclopentadiene which comprises, reacting chlorine with pentane in a mixture of the reactants of the volume ratio of 40–80 of the former to one of the latter at a temperature within the range of about 400–550° C. in the presence of barium sulfate.

3. A continuous process for the preparation of hexachlorocyclopentadiene which comprises, flowing a mixture of chlorine and pentane over a barium sulfate catalyst in a heating zone, heating the mixture therein to a temperature within the range of about 400–550° C., the volume ratio of chlorine to pentane in the mixture initially being 40–80 of the former to one of the latter, and maintaining the flow through the heating zone at a rate which consumes substantially all of the pentane, whereby hexachlorocyclopentadiene in high yields is obtained.

4. A continuous process for the preparation of hexachlorocyclopentadiene which comprises, flowing a mixture of chlorine and pentane over a barium sulfate catalyst in a heating zone, heating the mixture therein to a temperature within the range of about 400–550° C., the volume ratio of chlorine to pentane in the mixture initially being 40–80 of the former to one of the latter, maintaining the flow through the heating zone at a rate which consumes substantially all of the pentane, separating from the effluent reaction mass the hydrogen chloride formed, the chlorinated organic byproducts and the excess chlorine whereby hexachlorocyclopentadiene in purified form and in high yields is obtained.

5. A continuous process for the preparation of hexachlorocyclopentadiene which comprises, flowing a mixture of chlorine and pentane over a barium sulfate catalyst in a heating zone, heating the mixture therein to a temperature within the range of about 400–550° C., the volume ratio of chlorine to pentane in the mixture initially being 40–80 of the former to one of the latter, maintaining the flow through the heating zone at a rate which consumes substantially all of the pentane, separating the hydrogen chloride from the effluent gases by dissolution and the chlorinated organic products by condensation and rectification, separating the excess chlorine from the hexachlorocyclopentadiene formed, and recycling the recovered chlorine in a condition substantially free of any pentane whereby purified hexachlorocyclopentadiene is obtained in high yields in a continuous process free of the dangers of explosion.

References Cited in the file of this patent

UNITED STATES PATENTS 2,714,124    Maude et al.  ----------- July 26, 1955

FOREIGN PATENTS 818,347    Germany  -------------- Oct. 25, 1951